(12) United States Patent
Chakrabarti et al.

(10) Patent No.: US 12,411,747 B1
(45) Date of Patent: Sep. 9, 2025

(54) REAL TIME EQUIPMENT STATUS MONITORING SYSTEM AND METHOD

(71) Applicant: IEM America Corporation, Auburn, WA (US)

(72) Inventors: Satyajit Chakrabarti, Auburn, WA (US); Amartya Mukherjee, Kolkata (IN); Ayan Kumar Panja, Kolkata (IN); Souvik Chatterjee, Howrah (IN)

(73) Assignee: IEM America Corporation, Auburn, WA (US)

( * ) Notice: Subject to any disclaimer, the term of this patent is extended or adjusted under 35 U.S.C. 154(b) by 0 days.

(21) Appl. No.: 18/769,450

(22) Filed: Jul. 11, 2024

(30) Foreign Application Priority Data

May 3, 2024 (IN) .............................. 202431035261

(51) Int. Cl.
*G06F 11/30* (2006.01)
*G06F 11/32* (2006.01)

(52) U.S. Cl.
CPC ...... *G06F 11/3058* (2013.01); *G06F 11/3006* (2013.01); *G06F 11/321* (2013.01)

(58) Field of Classification Search
CPC . G06F 11/3058; G06F 11/3006; G06F 11/321
See application file for complete search history.

(56) References Cited

U.S. PATENT DOCUMENTS

| | | | | |
|---|---|---|---|---|
| 4,868,728 | A * | 9/1989 | Nuns .................... | H02M 7/538 363/17 |
| 9,817,740 | B2 * | 11/2017 | Johnson ................ | G06F 11/324 |
| 2014/0167761 | A1 * | 6/2014 | Seki .................... | G01R 33/4808 324/322 |
| 2015/0207716 | A1 * | 7/2015 | Sexton ................. | G06Q 30/016 370/241 |
| 2016/0300585 | A1 * | 10/2016 | Wu ....................... | G10L 21/057 |
| 2018/0063698 | A1 * | 3/2018 | Sonntag ............... | H04L 67/303 |
| 2021/0169417 | A1 * | 6/2021 | Burton ................. | A61B 5/4857 |
| 2021/0361481 | A1 * | 11/2021 | Gliner .................. | A61B 34/73 |
| 2021/0389214 | A1 * | 12/2021 | Glennon ............. | G01M 13/045 |
| 2022/0043424 | A1 * | 2/2022 | Cella ................... | G05B 23/0259 |

OTHER PUBLICATIONS

Gao et al. Data Collection Methods Based on Mobile Sink Node, 2015.*
IEEE, Using Publish/Subcribe for Short-Lived IoT Data, 2018.*

* cited by examiner

*Primary Examiner* — Arleen M Vazquez
*Assistant Examiner* — Lynda Dinh
(74) *Attorney, Agent, or Firm* — Grandview Law PLLC

(57) ABSTRACT

Systems and methods are provided for real time monitoring of equipment status for display by subscriber-based electronic client application electronic user interfaces including real time electronically receiving equipment status monitoring sensor data from a plurality of electronic sensors; real time electronically filtering of the equipment status monitoring sensor data; real time electronically determining equipment status information; and real time electronically transmitting equipment status information to the at least one subscriber-based electronic client user interface application based on at least one subscriber status associated with the at least subscriber-based one electronic client user interface application. Other aspects are described in the claims, drawings, and text forming a part of the present disclosure.

20 Claims, 8 Drawing Sheets

220

222
real time electronically receiving communication packet(s) from electronic sensor source(s)

224
real time electronically identifying electronic sensor source(s) of communication packet(s)

226
real time electronically determining data type(s) of communication packet data portion(s)

262
real time electronically determining analysis technique(s) suitable for filtered signal pattern(s) based on data type(s) of communication packet data portion(s)

264
real time electronically applying analysis technique(s) to filtered signal pattern(s) determined as suitable based on data type(s) of communication packet data portion(s)

266
when warranted, real time electronically assigning one or more display instructions to include in equipment status information for use by at least one subscriber-based electronic user interface client application

268
when warranted, real time electronically assigning one or more equipment status indicators to include in equipment status information for use by at least one subscriber-based electronic user interface client application

270
when warranted, real time electronically assigning one or more portions of the signal portion(s) contained in sensor measurement data portion(s) to include in equipment status information for use by at least one subscriber-based electronic user interface client application

272
when warranted, real time electronically assigning one or more portions of the filtered signal portion(s) contained in sensor measurement data portion(s) to include in equipment status information for use by at least one subscriber-based electronic user interface client application

282
real time electronically identifying subscriber-based electronic user interface client application(s) associated with the identified electronic sensor source(s) of the communication packet(s)

284
real time electronically determining subscriber policy for each identified subscriber-based electronic user interface client application(s)

286
when warranted by subscriber policy, real time electronically sending equipment status information to identified subscriber-based electronic user interface client application(s) without prompting by identified subscriber-based electronic user interface client application(s)

288
when warranted by subscriber policy, real time sending equipment status information to identified subscriber-based electronic client user interface application(s) when prompted by identified subscriber-based electronic user interface client application(s)

302
real time electronically assigning system number(s) to signal portion(s) of sensor measurement data portion(s) based on sensor identification contained in received associated communication packet(s)

304
real time electronically notifying electronic server(s) of storage request

306
electronically receive approval by electronic server(s) of storage request

308
upon approval, real time electronically sending equipment status information associated with approved storage request to electronic server(s) for storage at least partially in matrix form according to assigned system number(s)

FIG 8

REAL TIME EQUIPMENT STATUS MONITORING SYSTEM AND METHOD

CROSS-REFERENCE(S) TO RELATED APPLICATION(S)

This application claims the benefit under 35 U.S.C. § 119 (b) of Indian Patent Application number 202431035261, filed on May 3, 2024, which is incorporated by reference in its entirety herein.

TECHNICAL FIELD

The technical field relates to real-time monitoring systems for industrial equipment utilizing sensor data (e.g., vibration, temperature, ultrasound, and magnetic flux) to provide predictive maintenance and fault diagnostics of heavy machinery.

BACKGROUND ART

Industrial heavy machinery require continual maintenance, which if neglected can cause equipment failure, property damage, and human injury. Reduction of such undesired outcomes can be achieved by detection of anomalies and by predictive maintenance. Conventional detection approaches include use of distinct sensor data. For instance, Celia et al. (US20150207716A1) introduces a system and method for predictive analytics in industrial machinery using sensors to monitor machinery status. Cella et al. (U.S. Pat. No. 20220043424A1) uses a data collection system with frequency analysis and semantic processing. These approaches rely on centralized processing of collected data.

SUMMARY

In implementations a computer implemented method of providing real time monitoring of equipment status for display by at least one subscriber-based electronic user interface client application is provided, the computer implemented method includes real time electronically receiving equipment status monitoring sensor data from a plurality of electronic sensors based on one or more data types selected from a plurality of data types including but not limited to temperature data, magnetic flux data, vibration data, and ultrasound data; real time electronically filtering of the equipment status monitoring sensor data to produce filtered equipment status monitoring sensor data with reduced noise content; real time electronically determining at least in part one or more equipment status information based on one or more aspects of the filtered equipment status monitoring sensor data, wherein the equipment status information includes one or more selections from a list including but not limited to one or more equipment status indicators, the equipment status monitoring sensor data, and the filtered equipment status monitoring sensor data, and one or more display instructions for use by the at least one subscriber-based electronic user interface client application; and real time electronically transmitting equipment status information to the at least one subscriber-based electronic user interface client application based on at least one subscriber status associated with the at least one subscriber-based electronic user interface client application. Implementations further include real time electronically storing the equipment status information in at least one electronic server. Implementations include the equipment status monitoring sensor data includes spectrum form signal data generated from analog form signal data sampled in real time per one or more sample rates. Implementations include the one or more aspects of the filter equipment status monitoring sensor data include one or more aspects selected from a plurality of related considerations including but not limited to one or more dominant frequencies, one or more peak frequencies, one or more spectrum amplitude values, one or more spectral anomalies, one or more spectral patterns, one or more breach of data value thresholds, prior recorded data, number of equipment starts and stops, predictive analysis, equipment threshold failure, equipment threshold breach, and equipment failure. Implementations include the at least one subscriber status is based on one or more subscription identifications, wherein the real time electronically transmitting the equipment status information is performed as prompted by the at least one subscriber-based electronic user interface client application based on a first condition associated with the one or more subscription identifications, and wherein the real time electronically transmitting the equipment status information is performed without prompting by the at least one subscriber-based electronic user interface client application based on a second condition associated with the one or more subscription identifications. Implementations include the real time electronically transmitting the equipment status information includes transmitting one or more encrypted communication protocols, and wherein the real time electronically transmitting the equipment status information includes transmitting one or more MQTT IoT protocols. Implementations include the real time electronically receiving equipment status monitoring sensor data includes receiving data from one or more sensing network sink nodes, and wherein the real time electronically receiving equipment status monitoring sensor data includes receiving data from one or more sensing network sink base stations.

In implementations a real time equipment status monitoring system for providing real time monitoring of equipment status for display by at least one subscriber-based electronic user interface client application is provided, the real time equipment status monitoring system includes at least one memory; and at least one processor configured to: real time electronically receiving equipment status monitoring sensor data from a plurality of electronic sensors based on one or more data types selected from a plurality of data types including but not limited to temperature data, magnetic flux data, vibration data, and ultrasound data; real time electronically filtering of the equipment status monitoring sensor data to produce filtered equipment status monitoring sensor data with reduced noise content; real time electronically determining at least in part one or more equipment status information based on one or more aspects of the filtered equipment status monitoring sensor data, wherein the equipment status information includes one or more selections from a list including but not limited to one or more equipment status indicators, the equipment status monitoring sensor data, and the filtered equipment status monitoring sensor data, and one or more display instructions for use by the at least one subscriber-based electronic user interface client application; and real time electronically transmitting equipment status information to the at least one subscriber-based electronic user interface client application based on at least one subscriber status associated with the at least one subscriber-based electronic user interface client application. Implementations include the real time equipment status monitoring system of claim 8 wherein the at least one processor is further configured to: real time electronically storing the equipment status information in at least one electronic server. Implementations include the equipment status monitoring sensor data includes spectrum form signal data generated from analog form signal data sampled in real time per one or more sample rates. Implementations include the one or more aspects of the filter equipment status monitoring sensor data include one or more aspects selected from a plurality of related considerations including but not limited to one or more dominant frequencies, one or more peak frequencies, one or more spectrum amplitude values, one or more spectral anomalies, one or more spectral patterns, one or more breach of data value thresholds, prior recorded data, number of equipment starts and stops, predictive analysis, equipment threshold failure, equipment threshold breach, and equipment failure. Implementations include the at least one subscriber status is based on one or more subscription identifications, wherein the real time electronically transmitting the equipment status information is performed as prompted by the at least one subscriber-based electronic user interface client application based on a first condition associated with the one or more subscription identifications, and wherein the real time electronically transmitting the equipment status information is performed without prompting by the at least one subscriber-based electronic user interface client application based on a second condition associated with the one or more subscription identifications. Implementations include the real time electronically transmitting the equipment status information includes transmitting one or more encrypted communication protocols, and wherein the real time electronically transmitting the equipment status information includes transmitting one or more MQTT IoT protocols.

Implementations include a non-transitory computer readable medium including instruction for use on one or more electronic computing devices, the instructions being usable to execute a method of providing real time monitoring of equipment status for display by at least one subscriber-based electronic user interface client application, the method includes real time electronically receiving equipment status monitoring sensor data from a plurality of electronic sensors based on one or more data types selected from a plurality of data types including but not limited to temperature data, magnetic flux data, vibration data, and ultrasound data; real time electronically filtering of the equipment status monitoring sensor data to produce filtered equipment status monitoring sensor data with reduced noise content; real time electronically determining at least in part one or more equipment status information based on one or more aspects of the filtered equipment status monitoring sensor data, wherein the equipment status information includes one or more selections from a list including but not limited to one or more equipment status indicators, the equipment status monitoring sensor data, and the filtered equipment status monitoring sensor data, and one or more display instructions for use by the at least one subscriber-based electronic user interface client application; and real time electronically transmitting equipment status information to the at least one subscriber-based electronic user interface client application based on at least one subscriber status associated with the at least one subscriber-based electronic user interface client application. Implementations include real time electronically storing the equipment status information in at least one electronic server. Implementations include the equipment status monitoring sensor data includes spectrum form signal data generated from analog form signal data sampled in real time per one or more sample rates. Implementations include the one or more aspects of the filter equipment status monitoring sensor data include one or more aspects selected from a plurality of related considerations including but not limited to one or more dominant frequencies, one or more peak frequencies, one or more spectrum amplitude values, one or more spectral anomalies, one or more spectral patterns, one or more breach of data value thresholds, prior recorded data, number of equipment starts and stops, predictive analysis, equipment threshold failure, equipment threshold breach, and equipment failure. Implementations include the at least one subscriber status is based on one or more subscription identifications, wherein the real time electronically transmitting the equipment status information is performed as prompted by the at least one subscriber-based electronic user interface client application based on a first condition associated with the one or more subscription identifications, and wherein the real time electronically transmitting the equipment status information is performed without prompting by the at least one subscriber-based electronic user interface client application based on a second condition associated with the one or more subscription identifications. Implementations include the real time electronically transmitting the equipment status information includes transmitting one or more encrypted communication protocols, and wherein the real time electronically transmitting the equipment status information includes transmitting one or more MQTT IoT protocols. Implementations include the real time electronically receiving equipment status monitoring sensor data includes receiving data from one or more sensing network sink nodes, and wherein the real time electronically receiving equipment status monitoring sensor data includes receiving data from one or more sensing network sink base stations.

In addition to the foregoing, other aspects are described in the claims, drawings, and text forming a part of the disclosure set forth herein. Various other aspects are set forth and described in the teachings such as text (e.g., claims and/or detailed description) and/or drawings of the present disclosure. The foregoing is a summary and thus may contain simplifications, generalizations, inclusions, or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

FIG. 4 is a representative flow diagram of associated with the aspects of a first portion of the representative flow diagram of FIG. 3.

FIG. 6 is a representative flow diagram of associated with the aspects of a third portion of the representative flow diagram of FIG. 3.

FIG. 7 is a representative flow diagram of associated with the aspects of a fourth portion of the representative flow diagram of FIG. 3.

FIG. 8 is a representative flow diagram of associated with the aspects of a fifth portion of the representative flow diagram of FIG. 3.

For a more complete understanding of implementations, reference now is made to the following descriptions taken in connection with the accompanying drawings. The use of the same symbols in different drawings typically indicates similar or identical items, unless context dictates otherwise.

Figure 1:
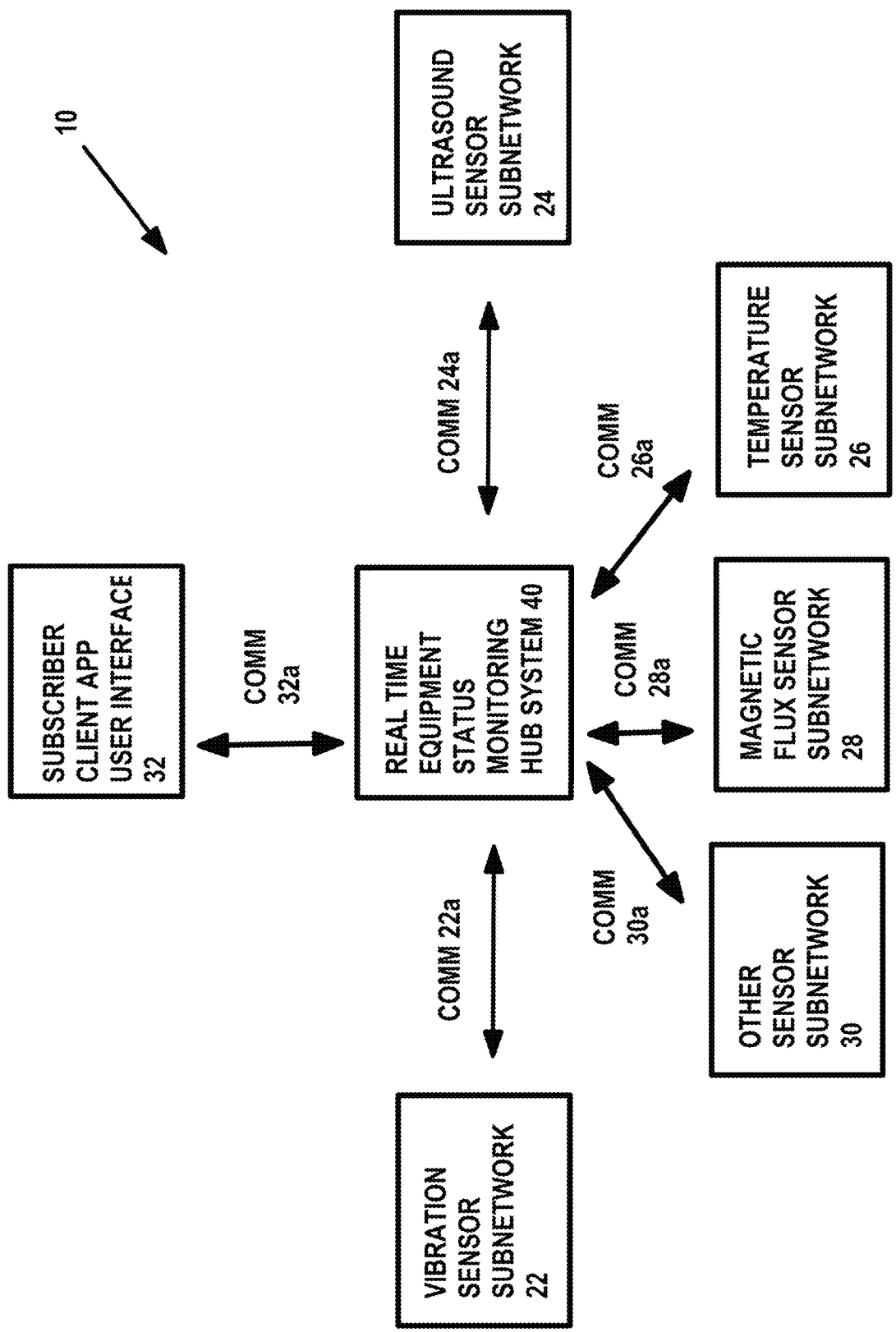
FIG. 1 is a representative conceptual schematic diagram of a real time equipment status monitoring system.

With reference now to the figures, shown are one or more examples of Real Time Equipment Status Monitoring System and Method, articles of manufacture, compositions of matter for same that may provide context, for instance, in introducing one or more processes and/or devices described herein.

DETAILED DESCRIPTION

In the following detailed description, reference is made to the accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here.

The term, computer readable medium, does not include "transitory waves or signals." As used herein, the terms "include" and "comprise" are used synonymously, which terms and variants thereof are intended to be construed as non-limiting. Furthermore, the term, "real time," is used as commonly defined by The American Heritage® Dictionary of the English Language, 5th Edition to be "[t]he time required for a computer to solve a problem, measured from the time data are fed in to the time a solution is received" and as commonly defined by the Cambridge Dictionary to be "the very short amount of time needed for computer systems to receive data and information and then communicate it or make it available." The term, MQTT, is associated with the term, message queues telemetry transport. The term, IoT, is associated with the term, the Internet of things.

Throughout various portions of the following description, implementations are described in the context of application to IoT MTQQ protocols, distributed electronic client sensors, one or more electronic broker servers that may be less distributed, and at least one subscriber-based electronic user interface client application distributed elsewhere which all can be involved with real time operations. However, as will be understood by one skilled in the art after reviewing this disclosure, various implementations of the present disclosure may have a wide variety of applications in other contexts not expressly enumerated, such as, for example, other device architectures, groupings of devices, protocols, networks, computer configurations, etc. being used for such real time operations. Various implementations of the present disclosure are described in the context of electronic edge, middleware, and application levels regarding device, computer and software application usable for collecting, analyzing, storing, and publishing to at least one subscriber-based electronic user interface client application on status regarding various equipment being monitored. However, for each of the features described, it is contemplated that in some embodiments, these aspects can also be provided in other configurations to achieve similar goals of real time subscriber-based publishing of status of equipment being monitored to associated at least one subscriber-based electronic user interface client application as an original component of the communications software, rather than a modification or supplementation.

Implementations can relate generally to the field of IoT including at least one framework of data collection, data storage in one or more local servers and fetching stored and desired data to one or more subscribed clients via one or more displays. Data Implementations can include real time values of vibration, ultrasound, magnetic flux, and temperature collected by respective sensors.

Implementations include personalized digitized data provided accordingly. Implementations can include industrial information requirements for heavy machinery, which can demand continual status and maintenance since failure of such can cause havoc. Implementations can assist in avoiding such havoc by providing early detection of anomalies and providing information regarding predictive maintenance. Implementations include distinct sensor data. Implementations include real time data for the corresponding subscribed client requests. Implementations provide real time data of diversified sensor values. Implementations can provide one or more integrated values of different types of real time data collected from the different types of sensors including but not limited to vibration, ultrasound, flux, and temperature. Implementations can transfer associated data to one or more sink nodes utilizing MQTT protocols.

Implementations can provide a comprehensive framework for real-time device and equipment health monitoring, focusing on optimizing processing units at the edge level. By amalgamating diverse sensing modalities such as vibration, magnetic flux, temperature, and ultrasound, implementations can provide holistic approaches to data collection and analysis. Implementations can provide real-time data provisioning tailored to specific client requests.

Implementations can leverage MQTT protocols to provide efficient data transmission strategies thereby ensuring seamless communication between edge devices and one or more centralized servers. Implementations can include application layer predictive analysis techniques thereby enabling proactive maintenance and anomaly detection of associated equipment. By extracting significant features from processed data, implementations can provide valuable insights into device health and performance. Implementations can enhance user interaction through one or more user-friendly interfaces to facilitate intuitive access to personalized data monitoring. Implementations can incorporate features such as live monitoring, alert mechanisms, and graphical representations, to empower users of such with actionable information for their decision-making.

Implementations can use a comprehensive framework for real-time device health monitoring, integrating diverse sensing modalities and advanced data processing techniques. Implementations can utilize a three-tiered architecture and the MQTT protocol to enable efficient data collection, transmission, and analysis. Implementations include predictive analysis for anomaly detection, an intuitive user interface for personalized monitoring, and robust security measures to safeguard user data. Implementation can enhance maintenance practices across industries by optimizing operational efficiency and ensuring proactive maintenance strategies.

Implementations present a framework of real time data collection from different sensing modalities and further predictive analysis. This data can be pre-processed at edge level and can be transported utilizing the MQTT protocol to a broker server. This can be further connected to a display or dashboard based one or more subscriptions from various clients. Requested data related to one or more subscribed clients can be extracted by one or more servers and can be displayed to one or more dashboards. Implementations can show real time values of temperature, vibration, magnetic flux and ultrasound simultaneously to one or more clients. Implementations can include a system architecture that is a 3-level structure that includes edge level, middleware level and application level.

Regarding data collection, implementations can collect data from various sensors such as vibration sensors, magnetic flux sensors, temperature sensors and ultrasonic sensors that monitor respective parameters of vibration, magnetic flux, temperature and ultrasound properties. Implementations can store these values in matrix form corresponding to system number for data collected.

Regarding data processing, implementations can use MQTT protocols to process collected data. MQTT protocols can be an efficient transmission protocols used by IoT devices like sensors, wearable's etc., to identify dominant frequencies in the vibration and magnetic flux spectrum. Edge level processing implementations can include analog data collection with variable sampling rates followed by conversion of signal to spectrum generation. Implementations can remove noise from one or more respective spectrums through use of filters for significant noise filtration. Implementations can identify one or more peak or dominant frequencies from one or more filtered signals from which anomalies or faults can be detected and identified.

Regarding feature extraction, implementations can extract significant features from processed data. Features can include anomaly detection, spectral features etc . . . , which can result from implementations analyzing corresponding frequencies available and detecting respective patterns of real time values such as of vibration, magnetic flux, ultrasound and temperature. Implementations can store analysis and features in one or more local servers which implementations can use broadcasting to subscribed client, which can use one or more various display dashboards.

Regarding user interface, implementations can allow for interaction with users through one or more user-friendly interfaces that can display live monitoring of personalized data. One or more initial pages of one or more user interface dashboards can include an option named workshop, which can store information regarding number of operational devices. For every operational device, implementations can display live monitoring, alert mechanisms for abnormal values, machine service status, number of starts and stops of assets in the form of graphs, gauges etc. Implementations can include one or more diagnosis pages, which can store the information of early recorded data. Implementations can accordingly increase user attention through one or more failure alerts, one or more enhanced interactive graphical user interfaces that can be easy to use and understandable to users without requiring specialized training.

Regarding security and privacy, implementations can provide security and privacy of user data by implementing encryption, access controls, and secure communication protocols. Implementations can only allow authorized personnel to have access to data, and can allow users to have control over how their data is shared and used.

Implementations can be directed to a framework for real time device health monitoring at optimized edge enabled processing units. Implementations can utilize systematic data converge casting strategy towards a common sink utilizing MQTT protocols. Implementations can further process gathered data in application layer for predictive analysis.

Turning to FIG. 1, depicted therein is a representative implementation conceptual schematic diagram of real time equipment status monitoring system 10 including real time equipment status monitoring hub system 40 having communication 22a with vibration sensor subnetwork 22 of at least one vibration sensor, communication 24a with ultrasound sensor subnetwork of at least one ultrasound sensor 24, communication 26a with temperature sensor subnetwork 26 of at least one temperature sensor, communication 28a with magnetic flux sensor subnetwork 28 of at least one magnetic flux sensor subnetwork, communication 30a with other sensor subnetwork 30 with at least one other sensor, communication 32a with at least one subscriber-based electronic user interface client application 32. In implementations, communication can vary between real time equipment status monitoring hub system 20 and various groupings of various sensor networks described.

Figure 2:
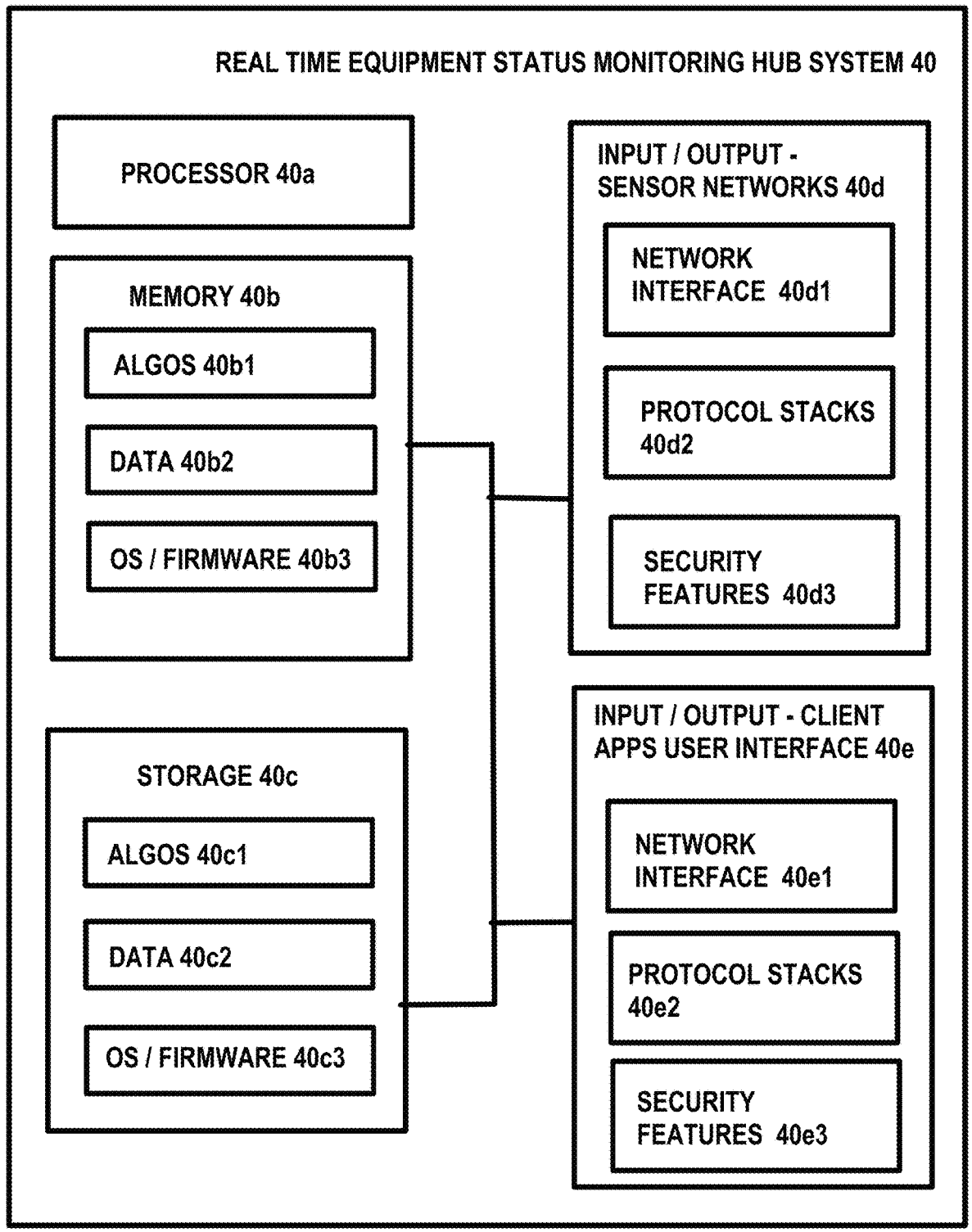
FIG. 2 is a representative conceptual schematic diagram of the real time equipment status monitoring hub system shown in FIG. 1.

Turning to FIG. 2, depicted therein is a representative implementation conceptual schematic diagram of real time equipment status monitoring hub system 40 including processor 40a; memory 40b with algos 40b1, data 40b2, and OS/firmware 40b3; storage 40c with algos 40c1, data 40c2, and OS/firmware 40c3; input/output component for sensor networks 40d with network interface 40d1, protocol stacks 40d2, and security features 40d3; input/output component for client applications user interface 40e with network interface 40e1, protocol stacks 40e2, and security features 40e3.

Figure 3:
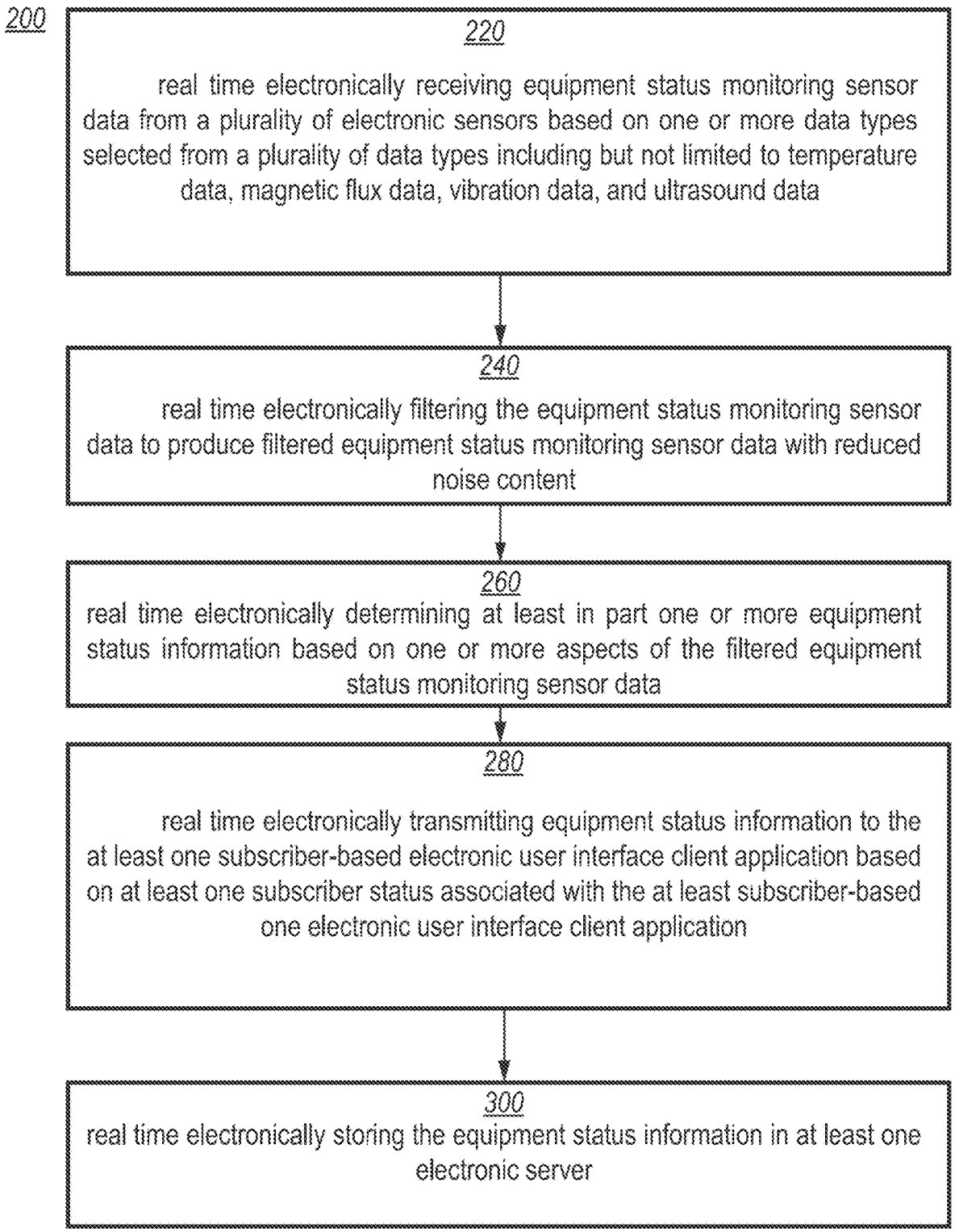
FIG. 3 is a representative flow diagram associated with aspects of the real time equipment status monitoring system of FIG. 1.

Turning to FIG. 3, depicted therein is a representative flow diagram associated with aspects of real time equipment status monitoring system 10 involving method 200 of providing real time monitoring of equipment status for display by at least one subscriber-based electronic user interface client application including step 220, step 240, step 260, step 280, and step 300. Step 220 includes real time electronically receiving equipment status monitoring sensor data from a plurality of electronic sensors based on one or more data types selected from a plurality of data types including but not limited to temperature data, magnetic flux data, vibration data, and ultrasound data. Step 240 includes real time electronically filtering the equipment status monitoring sensor data to produce filtered equipment status monitoring sensor data with reduced noise content. Step 260 includes real time electronically determining at least in part one or more equipment status information based on one or more aspects of the filtered equipment status monitoring sensor data. Step 280 includes real time electronically transmitting equipment status information to the at least one subscriber-based electronic user interface client application based on at least one subscriber status associated with at least one subscriber-based electronic user interface client application. Step 300 includes real time electronically storing the equipment status information in at least one electronic server.

Turning to FIG. 4, depicted therein is a representative flow diagram associated with the aspects of real time equipment status monitoring system 10 involving method 220 of real time electronically receiving equipment status monitoring sensor data from a plurality of electronic sensors based on one or more data types selected from a plurality of data types including but not limited to temperature data, magnetic flux data, vibration data, and ultrasound data implementation of step 220 of method 200. Method 220 includes step 222, step 224, and step 226. Step 222 includes real time electronically receiving communication packet(s) from electronic sensor source(s). Step 224 includes real time electronically identifying electronic sensor source(s) of communication packet(s). Step 226 includes real time electronically determining data type(s) of communication packet data portion(s).

Figure 5:
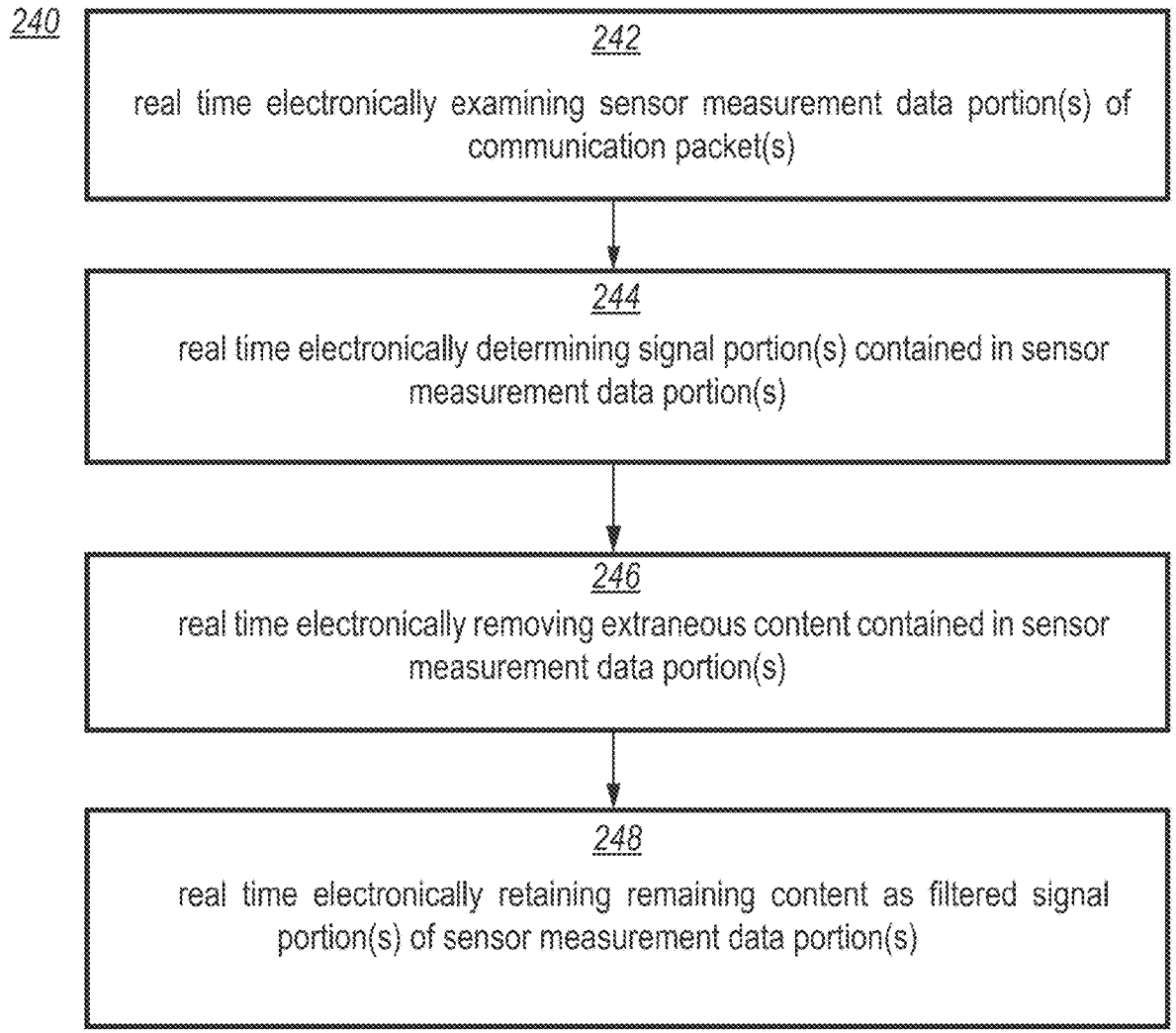
FIG. 5 is a representative flow diagram of associated with the aspects of a second portion of the representative flow diagram of FIG. 3.

Turning to FIG. 5, depicted therein is a representative flow diagram associated with the aspects of real time equipment status monitoring system 10 involving method 240 of implementation of step 240 of method 200. Method 240 includes step 242, step 244, step 246, and step 248. Step 242 includes real time electronically examining sensor measurement data portion(s) of communication packet(s). Step 244 includes real time electronically determining signal portion(s) contained in sensor measurement data portion(s). Step 246 includes real time electronically removing extraneous content contained in sensor measurement data portion(s). Step 248 includes real time electronically retaining remaining content as filtered signal portion(s) of sensor measurement data portion(s).

Turning to FIG. 6, depicted therein is a representative flow diagram associated with the aspects of real time equipment status monitoring system 10 involving method 260 of real time electronically determining at least in part one or more equipment status information based on one or more aspects of the filtered equipment status monitoring sensor data implementation of step 260 of method 200. Method 260 includes step 262, step 264, step 266, step 268, step 270 and step 272. Step 262 includes real time electronically determining analysis technique(s) suitable for filtered signal pattern(s) based on data type(s) of communication packet data portion(s). Step 264 includes real time electronically applying analysis technique(s) to filtered signal pattern(s) determined as suitable based on data type(s) of communication packet data portion(s). Step 266 includes when warranted, real time electronically assigning one or more display instructions to include in equipment status information for use by at least one subscriber-based electronic user interface client application. Step 268 includes when warranted, real time electronically assigning one or more equipment status indicators to include in equipment status information for use by at least one subscriber-based electronic user interface client application. Step 270 includes when warranted, real time electronically assigning one or more portions of the signal portion(s) contained in sensor measurement data portion(s) to include in equipment status information for use by at least one subscriber-based electronic user interface client application. Step 272 includes when warranted, real time electronically assigning one or more portions of the filtered signal portion(s) contained in sensor measurement data portion(s) to include in equipment status information for use by at least one subscriber-based electronic user interface client application.

Turning to FIG. 7, depicted therein is a representative flow diagram associated with the aspects of real time equipment status monitoring system 10 involving method 280 of real time electronically transmitting equipment status information to the at least one subscriber-based electronic user interface client application based on at least one subscriber status associated with the at least one subscriber-based electronic user interface client application of step 280 of method 200. Method 280 includes step 282, step 284, step 286, and step 288. Step 282 includes real time electronically identifying subscriber-based electronic user interface client application(s) associated with the identified electronic sensor source(s) of the communication packet(s). Step 284 includes real time electronically determining subscriber policy for each identified subscriber-based electronic user interface client application(s). Step 286 includes when warranted by subscriber policy, real time electronically sending equipment status information to identified subscriber-based electronic user interface client application(s) without prompting by identified subscriber-based electronic user interface client application(s). Step 288 includes when warranted by subscriber policy, real time sending equipment status information to identified subscriber-based electronic user interface client application(s) when prompted by identified subscriber-based electronic user interface client application(s).

Turning to FIG. 8, depicted therein is a representative flow diagram associated with the aspects of real time equipment status monitoring system 10 involving method 300 of real time electronically storing the equipment status information in at least one electronic server at least partially in matrix form regarding data system number implementation of step 300 of method 200. Method 300 includes step 302, step 304, step 306, and step 308. Step 302 includes real time electronically assigning system number(s) to signal portion(s) of sensor measurement data portion(s) based on sensor identification contained in received associated communication packet(s). Step 304 includes real time electronically notifying electronic server(s) of storage request. Step 306 includes electronically receiving approval by electronic server(s) of storage request. Step 308 includes upon approval, real time electronically sending equipment status information associated with approved storage request to electronic server(s) for storage at least partially in matrix form according to assigned system number(s).

Implementations of equipment status monitoring sensor data include spectrum form signal data generated from analog form signal data sampled in real time per one or more sample rates. Implementations of one or more aspects of the filter equipment status monitoring sensor data include one or more aspects selected from a plurality of related considerations including but not limited to one or more dominant frequencies, one or more peak frequencies, one or more spectrum amplitude values, one or more spectral anomalies, one or more spectral patterns, one or more breach of data value thresholds, prior recorded data, number of equipment starts and stops, predictive analysis, equipment threshold failure, equipment threshold breach, and equipment failure. Implementations of subscriber status can be based on one or more subscription identifications. Implementations of real time electronically transmitting the equipment status information can be performed as prompted by the at least one subscriber-based electronic user interface client application based on a first condition associated with one or more subscription identifications. Implementations of real time electronically transmitting the equipment status information can be performed without prompting by the at least one subscriber-based electronic user interface client application based on a second condition associated one or more subscription identifications. Implementations of real time electronically transmitting the equipment status information can include transmitting one or more encrypted communication protocols. Implementations of real time electronically transmitting the equipment status information can include transmitting one or more MQTT IoT protocols. Implementations of real time electronically receiving equipment status monitoring sensor data can include receiving data from one or more sensing network sink nodes. Implementations of real time electronically receiving equipment status monitoring sensor data can include receiving data from one or more sensing network sink base stations.

Although specific embodiments and examples of the disclosure have been described supra for illustrative purposes, various equivalent modifications can be made without departing from the spirit and scope of the disclosure, as will be recognized by those skilled in the relevant art after reviewing the present disclosure. The various embodiments described can be combined to provide further embodiments. The described devices, software, systems and methods can omit some elements or acts, can add other elements or acts, or can combine the elements or execute the acts in a different order than that illustrated, to achieve various advantages of the disclosure. These and other changes can be made to the disclosure in light of the above detailed description.

In general, in the following claims, the terms used should not be construed to limit the disclosure to the specific embodiments disclosed in the specification. Accordingly, the invention is not limited by the disclosure, but instead its scope is determined entirely by the following claims.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A computer implemented method of providing real time monitoring of equipment status within a three-level structure of edge level, middleware level, and application levels for display at the application level by at least one subscriber-based electronic user interface client application, the computer implemented method comprising:

real time electronically receiving at a plurality of edge level sensor subnetworks for processing by the plurality of edge level sensor subnetworks, equipment status monitoring sensor data from a plurality of electronic sensors included in the plurality of edge level sensor subnetworks based on one or more data types selected from a plurality of data types including but not limited to temperature data, magnetic flux data, vibration data, and ultrasound data;

real time electronically processing of the equipment status monitoring sensor data at the plurality of edge level sensor subnetworks to produced processed equipment status monitoring sensor data including but not limited to conversion processing of analog data to digitally generate filtered spectrum information, reduced noise content information, anomaly detection information, feature extraction information, spectral frequency content information, and pattern detection information;

real time electronically determining at the plurality of edge level sensor subnetworks at least in part equipment status information to be electronically transmitted to one or more electronic middleware level servers based on one or more aspects of the processed equipment status monitoring sensor data, wherein the equipment status information includes one or more selections from a list including but not limited to one or more equipment status indicators, the equipment status monitoring sensor data, and the processed equipment status monitoring sensor data, and one or more display instructions for use by the at least one subscriber-based electronic user interface client application; and real time electronically transmitting the equipment status information from the one or more electronic middleware level servers to the application level of the at least one subscriber-based electronic user interface client application based on at least one subscriber status associated with the at least one subscriber-based electronic user interface client application.

2. The computer implemented method of claim 1 further including
real time electronically storing the equipment status information in at least one electronic server.

3. The computer implemented method of claim 1
wherein the processed equipment status monitoring sensor data includes spectrum form signal data generated from analog form signal data sampled in real time per one or more sample rates.

4. The computer implemented method of claim 1
wherein the one or more aspects of the processed equipment status monitoring sensor data include one or more aspects selected from a plurality of related considerations including but not limited to one or more dominant frequencies, one or more peak frequencies, one or more spectrum amplitude values, one or more spectral anomalies, one or more spectral patterns, one or more breach of data value thresholds, prior recorded data, number of equipment starts and stops, predictive analysis, equipment threshold failure, equipment threshold breach, and equipment failure.

5. The computer implemented method of claim 1
wherein the at least one subscriber status is based on one or more subscription identifications,
wherein the real time electronically transmitting the equipment status information is performed as prompted by the at least one subscriber-based electronic user interface client application based on a first condition associated with the one or more subscription identifications, and
wherein the real time electronically transmitting the equipment status information is performed without prompting by the at least one subscriber-based electronic user interface client application based on a second condition associated with the one or more subscription identifications.

6. The computer implemented method of claim 1
wherein the real time electronically transmitting the equipment status information includes transmitting one or more encrypted communication protocols, and
wherein the real time electronically transmitting the equipment status information includes transmitting one or more MQTT IoT protocols.

7. The computer implemented of claim 1
wherein the real time electronically receiving equipment status monitoring sensor data includes receiving data from one or more sensing network sink nodes, and
wherein the real time electronically receiving equipment status monitoring sensor data includes receiving data from one or more sensing network sink base stations.

8. A real time equipment status monitoring system for providing real time monitoring of equipment status within a three-level structure of edge level, middleware level, and application levels for display at the application level by at least one subscriber-based electronic user interface client application, the real time equipment status monitoring system comprising:
at least one memory; and
at least one processor configured to:
real time electronically receiving by a plurality of edge level sensor subnetworks for processing by the plurality of edge level sensor subnetworks, equipment status monitoring sensor data from a plurality of electronic sensors included in the plurality of edge level sensor subnetworks based on one or more data types selected from a plurality of data types including but not limited to temperature data, magnetic flux data, vibration data, and ultrasound data;
real time electronically processing of the equipment status monitoring sensor data at the plurality of edge level sensor subnetworks to produced processed equipment status monitoring sensor data including but not limited to conversion processing of analog data to digitally generate filtered spectrum information, reduced noise content information, anomaly detection information, feature extraction information, spectral frequency content information, and pattern detection information;
real time electronically determining at the plurality of edge level sensor subnetworks at least in part equipment status information to be electronically transmitted to one or more electronic middleware level servers based on one or more aspects of the processed equipment status monitoring sensor data,
wherein the equipment status information includes one or more selections from a list including but not limited to one or more equipment status indicators, the equipment status monitoring sensor data, and the processed equipment status monitoring sensor data, and one or more display instructions for use by the at least one subscriber-based electronic user interface client application; and
real time electronically transmitting the equipment status information from the one or more electronic middleware level servers to the application level of the at least one subscriber-based electronic user interface client application based on at least one subscriber status associated with the at least one subscriber-based electronic user interface client application.

9. The real time equipment status monitoring system of claim 8 wherein the at least one processor is further configured to:
real time electronically storing the equipment status information in at least one electronic server.

10. The real time equipment status monitoring system of claim 8
wherein the processed equipment status monitoring sensor data includes spectrum form signal data generated from analog form signal data sampled in real time per one or more sample rates.

11. The real time equipment status monitoring system of claim 8
wherein the one or more aspects of the processed equipment status monitoring sensor data include one or more aspects selected from a plurality of related considerations including but not limited to one or more dominant frequencies, one or more peak frequencies, one or more spectrum amplitude values, one or more spectral anomalies, one or more spectral patterns, one or more breach of data value thresholds, prior recorded data, number of equipment starts and stops, predictive analysis, equipment threshold failure, equipment threshold breach, and equipment failure.

12. The real time equipment status monitoring system of claim 8
wherein the at least one subscriber status is based on one or more subscription identifications,
wherein the real time electronically transmitting the equipment status information is performed as prompted by the at least one subscriber-based electronic user interface client application based on a first condition associated with the one or more subscription identifications, and wherein the real time electronically transmitting the equipment status information is performed without prompting by the at least one subscriber-based electronic user interface client application based on a second condition associated with the one or more subscription identifications.

13. The real time equipment status monitoring system of claim 8 wherein the real time electronically transmitting the equipment status information includes transmitting one or more encrypted communication protocols, and wherein the real time electronically transmitting the equipment status information includes transmitting one or more MQTT IoT protocols.

14. A non-transitory computer readable medium comprising instructions for use on one or more electronic computing devices, the instructions being usable to execute a method of providing real time monitoring of equipment status within a three-level structure of edge level, middleware level, and application levels for display at the application level by at least one subscriber-based electronic user interface client application, the method comprising:

real time electronically receiving by a plurality of edge level sensor subnetworks for processing by the plurality of edge level sensor subnetworks, equipment status monitoring sensor data from a plurality of electronic sensors included in the plurality of edge level sensor subnetworks based on one or more data types selected from a plurality of data types including but not limited to temperature data, magnetic flux data, vibration data, and ultrasound data;

real time electronically processing of the equipment status monitoring sensor data at the plurality of edge level sensor subnetworks to produced processed equipment status monitoring sensor data including but not limited to conversion processing of analog data to digitally generate filtered spectrum information, reduced noise content information, anomaly detection information, feature extraction information, spectral frequency content information, and pattern detection information;

real time electronically determining at the plurality of edge level sensor subnetworks at least in part equipment status information to be electronically transmitted to one or more electronic middleware level servers based on one or more aspects of the processed equipment status monitoring sensor data, wherein the equipment status information includes one or more selections from a list including but not limited to one or more equipment status indicators, the equipment status monitoring sensor data, and the processed equipment status monitoring sensor data, and one or more display instructions for use by the at least one subscriber-based electronic user interface client application; and real time electronically transmitting the equipment status information from the one or more electronic middleware level servers to the application level of the at least one subscriber-based electronic user interface client application based on at least one subscriber status associated with the at least one subscriber-based electronic user interface client application.

15. The medium of claim 14 further including real time electronically storing the equipment status information in at least one electronic server.

16. The medium of claim 14 wherein the processed equipment status monitoring sensor data includes spectrum form signal data generated from analog form signal data sampled in real time per one or more sample rates.

17. The medium of claim 14 wherein the one or more aspects of the processed equipment status monitoring sensor data include one or more aspects selected from a plurality of related considerations including but not limited to one or more dominant frequencies, one or more peak frequencies, one or more spectrum amplitude values, one or more spectral anomalies, one or more spectral patterns, one or more breach of data value thresholds, prior recorded data, number of equipment starts and stops, predictive analysis, equipment threshold failure, equipment threshold breach, and equipment failure.

18. The medium of claim 14 wherein the at least one subscriber status is based on one or more subscription identifications, wherein the real time electronically transmitting the equipment status information is performed as prompted by the at least one subscriber-based electronic user interface client application based on a first condition associated with the one or more subscription identifications, and wherein the real time electronically transmitting the equipment status information is performed without prompting by the at least one subscriber-based electronic user interface client application based on a second condition associated with the one or more subscription identifications.

19. The medium of claim 14 wherein the real time electronically transmitting the equipment status information includes transmitting one or more encrypted communication protocols, and wherein the real time electronically transmitting the equipment status information includes transmitting one or more MQTT IoT protocols.

20. The medium of claim 14 wherein the real time electronically receiving equipment status monitoring sensor data includes receiving data from one or more sensing network sink nodes, and wherein the real time electronically receiving equipment status monitoring sensor data includes receiving data from one or more sensing network sink base stations.

* * * * *